H. W. FROST.
LOOK-OUT ATTACHMENT.
APPLICATION FILED JAN. 6, 1916.
1,275,013.
Patented Aug. 6, 1918.
2 SHEETS—SHEET 1.
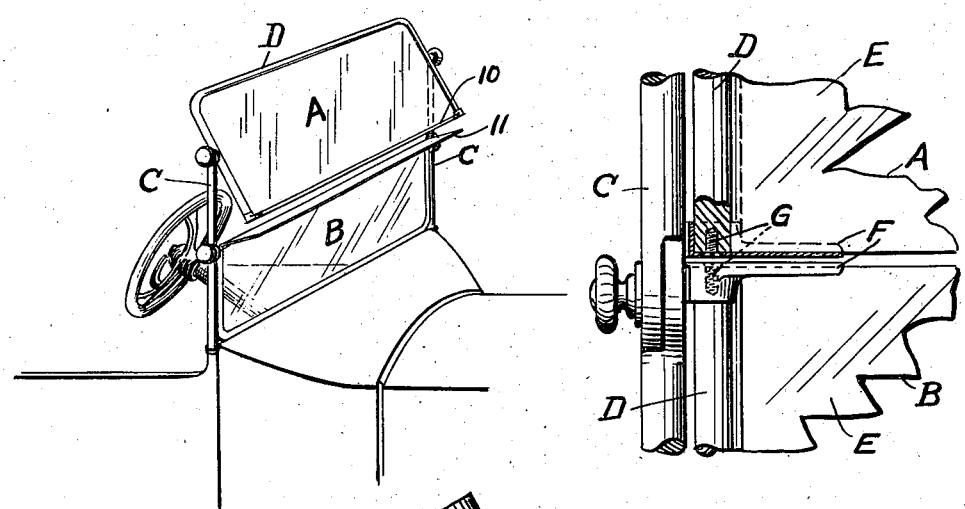
FIG.1.
FIG.2.
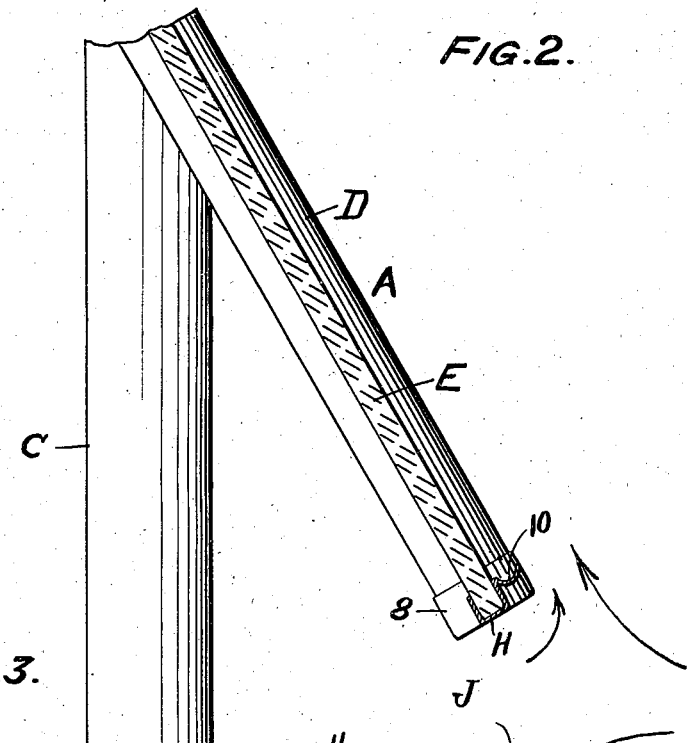
FIG.3.
WITNESS:
INVENTOR
Harry W. Frost
BY
ATTORNEYS.

H. W. FROST.
LOOK-OUT ATTACHMENT.
APPLICATION FILED JAN. 6, 1916.

1,275,013.

Patented Aug. 6, 1918.
2 SHEETS—SHEET 2.

WITNESS:

INVENTOR
Harry W. Frost
BY
ATTORNEYS.

UNITED STATES PATENT OFFICE.

HARRY W. FROST, OF DETROIT, MICHIGAN, ASSIGNOR TO CLEAR VISION WINDSHIELD COMPANY, OF DETROIT, MICHIGAN, A CORPORATION OF MICHIGAN.

LOOK-OUT ATTACHMENT.

1,275,013.

Specification of Letters Patent.

Patented Aug. 6, 1918.

Application filed January 6, 1916. Serial No. 70,562.

*To all whom it may concern:*

Be it known that I, HARRY W. FROST, a citizen of the United States, residing at Detroit, in the county of Wayne and State of Michigan, have invented certain new and useful Improvements in Look-Out Attachments, of which the following is a specification.

This invention relates to novel look-out means for application to standard automobile wind shields and the like, thereby affording a clear and extended field of vision regardless of severe weather conditions in seasons of snow and rain. One of the primary objects of the invention is to provide improved lookout device members which can be readily applied to standard wind shields without change or with a minimum change therein. My invention also contemplates the provision of look-out members of the character specified which require no fastening means in addition to those already found on certain types of standard wind shields. In general, it is the object of my invention to provide a simple and inexpensive look-out attachment which may be readily installed or removed by the inexperienced without the use of any special tools and without in any wise altering the arrangement of the wind shield so that if desired, the look-out device may be detached and the shield will present the same appearance and operate in the same manner as before.

The foregoing, together with such other objects as may hereinafter appear or are incident to my invention I attain by means of a construction, one preferred embodiment of which I have illustrated in the accompanying drawings, wherein—

Figure 4:
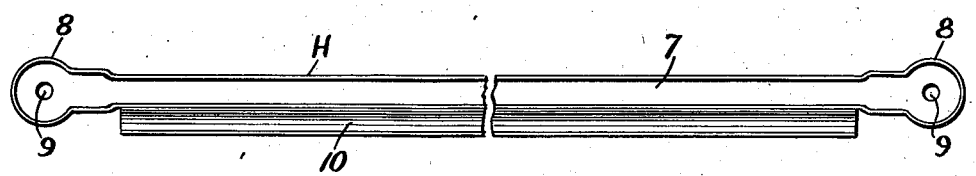
Figure 5:
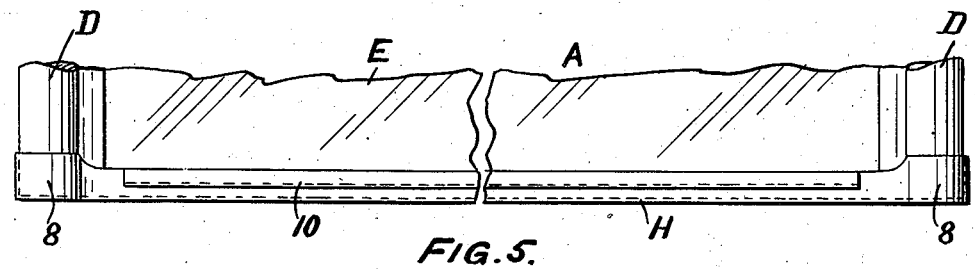
Figure 6:
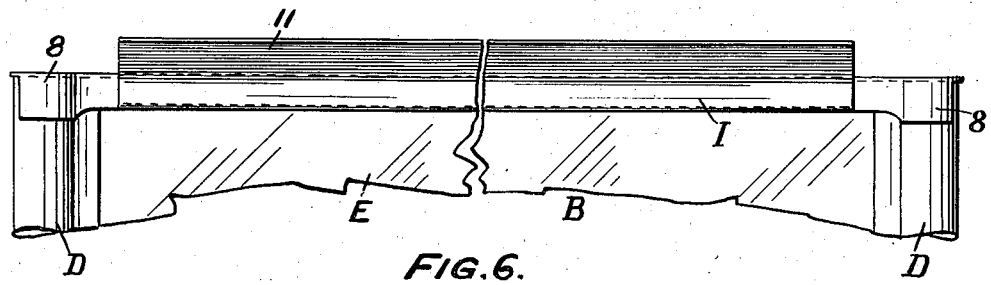
Figure 7:
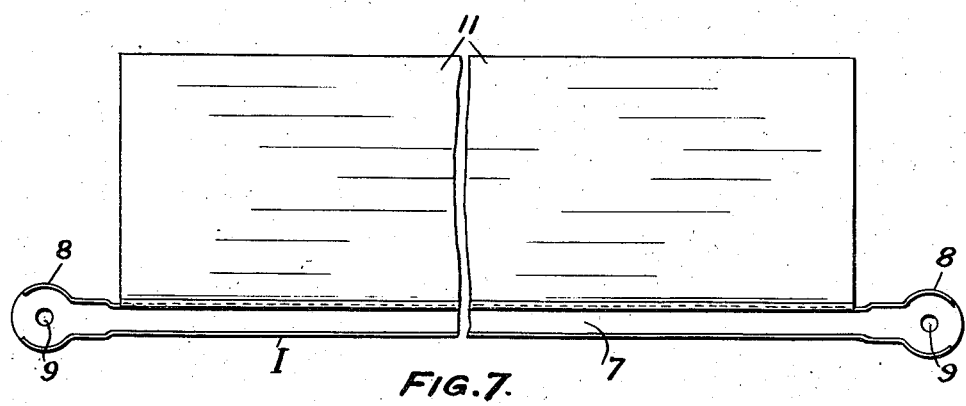

Figure 1 is a perspective view of a standard form of automobile wind shield to which my invention has been applied; Fig. 2 is a detailed view partly in section showing the means whereby the glasses are fastened in position in a standard wind shield; Fig. 3 is a sectional view drawn on a larger scale showing the improved attachment in cross section and illustrating the manner in which the devices operate when applied to a shield, Fig. 4 is a plan view of the upper look-out member; Fig. 5 is a side elevation of such member as applied; Fig. 6 is a front elevation of the lower member as applied; and Fig. 7 is a bottom plan view of the lower member.

The standard "so-called" rain vision wind shield comprises an upper section A and a lower section B, the latter being mounted in any preferred manner on the dash or cowl of the automobile, and the upper section being adjustably supported on the lower section by means of link mechanism C. The framework of the shield comprises a brass rod D suitably milled to receive the glasses E, the glasses in the type shown in the drawings being retained in position by means of socket members F, which in turn are fastened to the framework D by means of screws G. This form of fastening is illustrated in Fig. 2.

While the standard form of shield just above described can be conveniently adjusted to suit requirements in clear weather, yet it does not provide a clear field of vision in rainy or snowy weather. The slight gap between the edges of the sections of the shield is entirely inadequate for this purpose and in addition, if the upper section be adjusted so as to afford an adequate range of vision, snow or rain will pass through the widened gap between the sections. By my improvement I provide means whereby the field of vision of the ordinary shield is greatly increased while at the same time snow and rain are effectually excluded and are carried away from the look-out opening.

In carrying out my invention I provide a pair of look-out attachments or members H, I, to be secured to the upper and lower sections A and B respectively, both members preferably being co-extensive with the shield. These members are preferably stamped in sheet metal, each having a groove 7 adapted to fit over the edge of the respective glass and a socket portion 8 at each end. A hole 9 is formed in the bottom of each portion. Bent up from one edge of the member H is a projecting gutter portion 10 which is substantially co-extensive with the member in width and which is adapted to carry any moisture which may be deposited upon the upper section of the wind shield to the sides of the shield. Extending from one edge of the lower member I is a shelf portion 11 preferably arranged to incline upwardly from the horizontal when the member I is placed in position, as will be seen from inspection of Fig. 3. To apply the look-out members to the type of shield illustrated in the drawings, the screws G and sockets F are removed, the look-out members substituted for the socket members F, and the screws utilized in fastening such members in position on the framework B of the shield. In those types of wind shield in which the socket members F are dispensed with, my improved devices can be applied by tapping the ends of the frame to receive the screws G.

The members H and I, therefore, serve to retain the glasses E in position in their respective sections of the shield and will operate in conjunction with the upper section to constitute a look-out device, as will now be set forth. In rainy or snowy weather the upper section A is swung until it assumes a position such as that shown in Fig. 3, in which the upper edge of the section A is approximately above the outer edge of the member I, these members thus constituting a pair of planes diverging from the front to the rear and spaced apart to provide a rain vision gap or sight opening J of substantial proportions. The air, as it impinges upon the parts A and I, is divided into upwardly and downwardly directed currents which have a tendency to set up other currents from within the opening J respectively upwardly and downwardly, thereby effectually excluding particles of rain, snow or dust.

The drip from the upper section A is carried to one side as heretofore pointed out. The upper section of the shield may be swung open more widely than is shown in Fig. 3, and still be effective, because even if the lower edge of this section be in advance of the front edge of the shelf, the shelf will deflect the currents which pass downwardly from the upper section.

From the foregoing it will be seen the device is simple and inexpensive in construction, that it requires no additional fastening means other than those which may be already found in certain standard types of wind shields, that the attachments may be readily applied or removed; that they are not unsightly, nor do they interfere with the ordinary field of vision when the shield is closed; and that their use makes it possible to greatly increase the field of vision in heavy weather while at the same time no particles can work their way through the sight opening.

Other advantages will be apparent to those skilled in the art, and it will also be seen that the look out devices may be applied to other forms of wind shields or window devices.

It will also be noted that I have shown the preferred form only of my improvement and that variations and departures from the specific mechanism shown may be made without departing from the spirit of my invention.

I claim:

1. The combination with a two-part wind shield, the upper part of which is hinged to be rotated on a horizontal axis, of a look-out unit adapted to be attached to the lower part of the shield and projecting forwardly thereof to coöperate with hinged part when the latter is swung forwardly to provide a look-out device comprising two rearwardly diverging planes spaced apart at their forward edges to provide a sight gap.

2. The combination with a two-part wind shield, the upper part of which is hinged to be rotated on a horizontal axis, of a look-out unit comprising a plate-like member adapted to be attached to the upper horizontal edge of the lower part of the shield and projecting forwardly therefrom to coöperate with hinged part when the latter is swung forwardly to provide a look-out device comprising two rearwardly diverging planes spaced apart at their forward edges to provide a sight gap.

3. The combination with a two-part wind shield, the upper part of which is hinged to be rotated on a horizontal axis, of a look-out unit comprising a plate-like member having a groove at its inner edge adapted to fit over the upper horizontal edge of the lower part of the shield and projecting forwardly thereof to coöperate with hinged part when the latter is swung forwardly to provide a look-out device comprising two rearwardly diverging planes spaced apart at their forward edges to provide a sight gap.

4. The combination with a two-part wind shield, the upper part of which is hinged to be rotated on a horizontal axis, of a look-out unit adapted to be attached to the lower part of the shield and projecting forwardly thereof to coöperate with hinged part when the latter is swung forwardly to provide a look-out device comprising two rearwardly diverging planes spaced apart at their forward edges to provide a sight gap, said unit permitting the upper section to be freely swung into any operative position.

5. The combination with a standard two-part wind shield comprising a lower section and a pivoted upper section, of a plate-like member adapted to be mounted on the upper horizontal edge of the lower section and projecting forwardly thereof to coöperate with the upper section when the latter is swung forwardly to provide a look-out device consisting of two rearwardly diverging planes spaced apart at their forward edges, and a drip member adapted to be mounted on the lower horizontal edge of the upper section, both of said members permitting movement of the upper section to any operative position.

6. The combination with a standard automobile wind shield having two relatively movable sections, of a lookout unit adapted to be attached along the horizontal edge of either the upper or lower section and having a shelf-like portion projecting forwardly and extending in such manner as not to interfere with the opening or closing of the other section, and means for attaching said unit to the vertical marginal frames of either of the said sections.

In testimony whereof I have hereunto signed my name.

HARRY W. FROST.